United States Patent
Riley et al.

[11] 3,985,331
[45] Oct. 12, 1976

[54] HIGH RESOLUTION MICRO-METERING VALVE

[75] Inventors: James H. Riley, Fullerton; Owen T. O'Brien, Torrance, both of Calif.

[73] Assignee: Circle Seal Corporation, Anaheim, Calif.

[22] Filed: Jan. 6, 1975

[21] Appl. No.: 538,787

[52] U.S. Cl. .............................. 251/77; 251/122; 251/205; 251/322
[51] Int. Cl.² ........................................ F16K 47/04
[58] Field of Search ............ 137/525, 505.13, 529; 251/122, 278, 85, 205, 322, 77

[56] References Cited
UNITED STATES PATENTS

| | | | |
|---|---|---|---|
| 572,580 | 12/1896 | Spitzenberg | 251/278 |
| 830,210 | 9/1906 | Cookson | 251/278 X |
| 1,064,409 | 6/1913 | Wheary | 251/278 |
| 1,494,910 | 5/1929 | Hench | 251/278 X |
| 2,386,051 | 10/1945 | Kempton | 137/505.13 |
| 2,598,224 | 5/1952 | Clonts | 251/278 |
| 2,897,833 | 8/1959 | Seeler | 137/505.13 X |
| 3,642,026 | 2/1972 | Sielaff | 137/525 |
| 3,733,048 | 5/1973 | Hiszpanski | 137/525 X |

*Primary Examiner*—Arnold Rosenthal
*Attorney, Agent, or Firm*—Sellers and Brace

[57] ABSTRACT

A high resolution micro-metering valve having a non-rotary needle valve supported between a pair of calibrated coil springs of widely different spring rates. The lower rate spring is axially adjustable in minute increments by the valve actuator to vary the loading on the higher rate spring in an amount proportional to the ratio of the two spring rates. The valve actuator is free of all backlash and all relative movement with the valve packing is restricted to non-rotary axial movement. The valve proper can be contoured at will to provide linear or non-linear flow characteristics without need for any change in either of the two coil springs.

12 Claims, 4 Drawing Figures

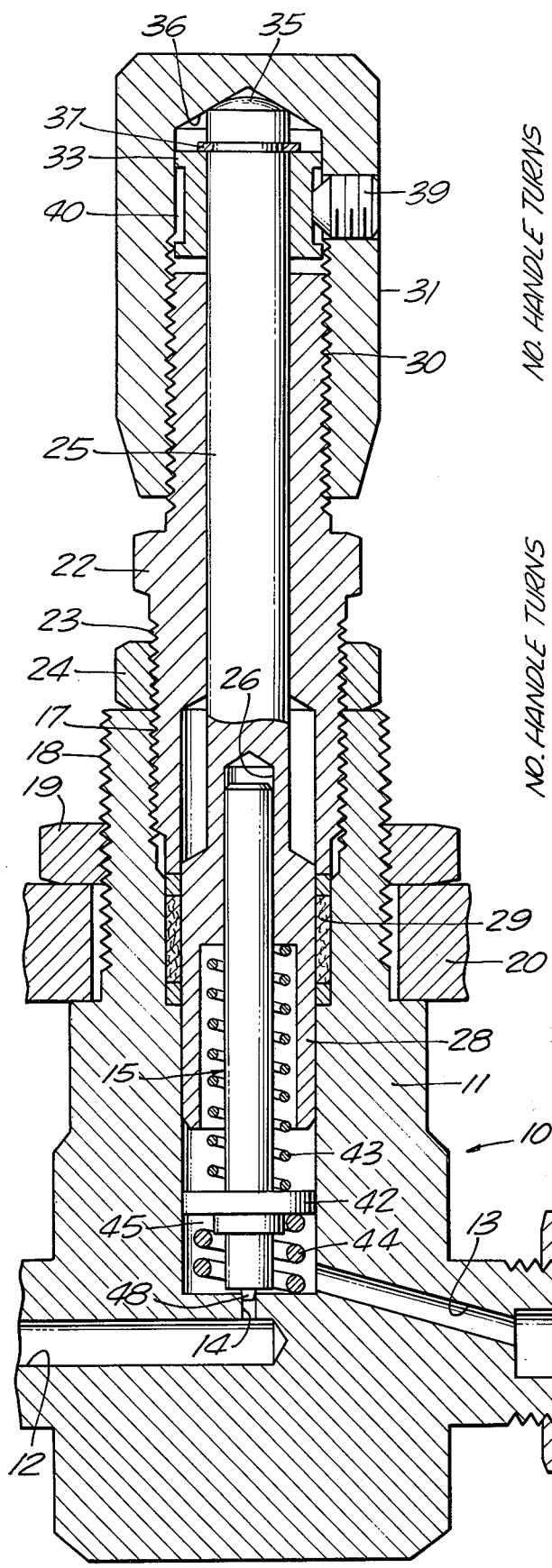
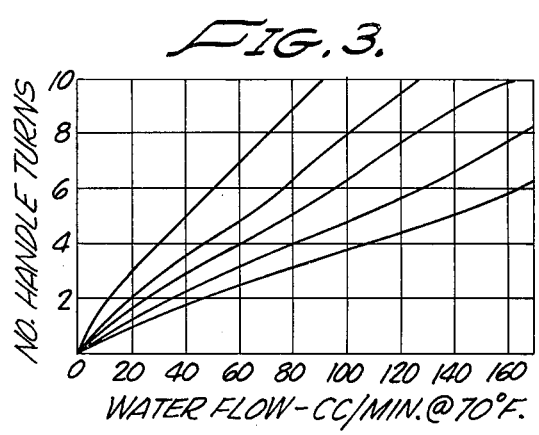
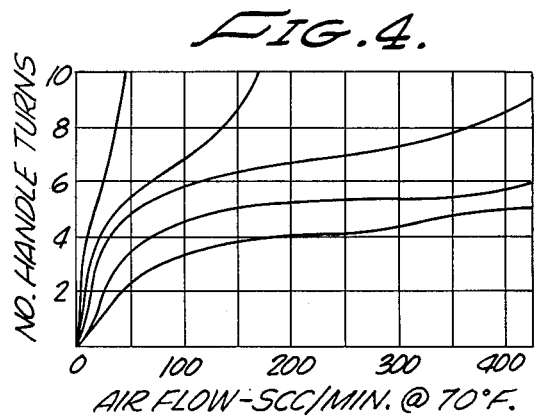
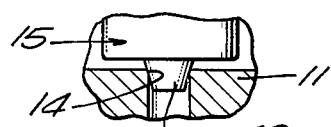

HIGH RESOLUTION MICRO-METERING VALVE

This invention relates to a high resolution micrometering valve of greatly improved effectiveness and reliability.

Numerous attempts have been made heretofore to provide a needle valve capable of providing extremely fine resolution of changes in flow. Some of these utilize a valve actuator held assembled to the valve body by fine low pitch threads. However, the resolution obtainable in this manner is limited by the fineness of a practical low pitch thread and is subject to other serious shortcomings including backlash, inability to handle high operating pressures and other problems well known to persons skilled in this art.

Sielaff U.S. Pat. No. 3,642,026 proposes a metering valve construction avoiding some of these prior shortcomings. His metering valve employs a spring disc as a valve with its center supported crosswise of and in close proximity to the metering port and is deflected toward or away from the port by varying the loading on a low rate coil spring supported between the valve actuator and the valve disc. A variant of this concept is disclosed in Hispanski U.S. Pat. No. 3,733,048, granted May 15, 1973 and substitutes a spring beam for Sielaff's spring disc, but otherwise closely approximates Sielaff's teachings. Although each of the aforementioned Sielaff and Hiszpanski metering valves represent certain improvements over earlier metering valve proposals, each is subject to shortcomings avoided by the present invention. Thus, with both the spring beam and the spring disc, the spring serves both as a valve element and as means biasing the valve away from the flow port. Accordingly, the characteristics of the flow rate cannot be changed by changing the contour of the valve since the valve is a spring beam or a spring disc of uniform thickness. In the improved metering valve of this invention, it is a simple matter to obtain either linear or a desired non-linear flow characteristic simply by changing the contour of the valve tip relative to the metering port. Stated differently, the invention valve is a member separate from the high rate spring and either can be readily replaced with a component having any desired characteristic without affecting the operation or design of the other component. Additionally, neither of the above identified prior art metering valves has provision for eliminating backlash in the actuator component, and each utilizes a rotary interface between the actuator packing and the valve body in sharp contrast to the invention construction wherein this rotary interface is eliminated.

Accordingly, it is a primary object of this invention to provide an improved high resolution micro-metering valve of improved design, high accuracy and reliability.

Another object of the invention is the provision of a micro-metering valve supporting a non-rotary valve member between a pair of coil springs having widely differing spring rates and employing improved actuator means for varying the axial lengths of the two springs differentially.

Another object of the invention is the provision of a micro-metering valve free of backlash and utilizing a valve actuator having a non-rotary interface with the valve packing.

Another object of the invention is the provision of a high-resolution micro-metering valve utilizing a non-rotary valve member supported between a pair of coil springs of widely differing spring rates and any one of which three components can be replaced by a similar unit of different design without need for latering either of the other two components.

These and other more specific objects will appear upon reading the following specification and claims and upon considering in connection therewith the attached drawing to which they relate.

Referring now to the drawing in which a preferred embodiment of the invention is illustrated:

FIG. 1 is a cross-sectional view through an illustrative embodiment of the valve in closed or substantially closed position;

FIG. 2 is a fragmentary enlarged view through the valve tip and the flow port;

FIG. 3 is a graphical illustration of the generally linear water flow characteristics at different pressure differentials obtained when using a tapering valve tip; and FIG. 4 is a similar graphical display of the air flow characteristics at different pressure differentials when using a tapering valve tip.

Referring to FIG. 1, there is shown a typical valve embodying the principles of this invention and designated generally 10. This valve has a main body 11 having similar inlet and outlet passages 12, 13 interconnected by a flow port 14 past which flow is controlled by the elongated valve member designated generally 15. Each of the inlet and outlet passages 12, 13 is provided with conventional couplings for connecting each passage to tubing not shown.

The upper end of the main body is provided with internal threads 17 and external threads 18. A lock nut 19 mounted on the latter threads serves to clamp valve 10 to any suitable panel or support 20. A bushing 22 provided with threads 23 mating with the threads 17 of the main body is held snugly assembled thereto by lock nut 24. Supported in bushing 22 is a spindle-like valve actuator 25 having a stepped well 26 opening axially into its lower end and loosely embracing the upper end of valve member 15. The enlarged lower end 28 of the actuator is surrounded by suitable packing material 29 which is maintained compressed and in sealing engagement with the valve body and actuator 25 by the lower end of bushing 22.

The upper end of bushing 22 is provided with precision low pitch threads 30 which mate with the corresponding threads interiorly of the cup-shaped control knob 31. The interior upper ends of knob 31 houses anti-backlash means. This backlash means includes a collar 33 having a loose rotary fit with the adjacent portion of actuator 25. The upper end of actuator 25 has a spherical surface 35 bearing directly against the conical surface 36 of knob 31. A split ring keeper 37 is mounted in a groove embracing the upper end of the spindle. Collar 33 bears against the underside of this keeper and is locked assembled to knob 31 by a set screw 39 while the conical surface 36 is held firmly seated against spherical surface 35 of the actuator. This set screw seats in a wide annular groove 40 of collar 33. Accordingly, it will be understood that there is no possible lost motion or backlash between actuator 25 and control knob 31.

Referring now to the lower end of the valve body, it is pointed out that valve member 15 is formed near its lower end with a radial enlargement 42. This enlargement is located between and provides a seat for the respective adjacent ends of the calibrated coil springs 43, 44 encircling opposite end portions of valve member 15. The upper end of spring 43 bears against an annular shoulder in the sidewall of well 26 axially of valve actuator 25 and the remote lower end of the spring 44 bears against the bottom of valve chamber 45 in an area surrounding valve port 14.

Typically, the spring rates of calibrated springs 43, 44 have widely differing values. In an illustrative typical embodiment, spring 43 may have a rate of 8 lbs. per inch whereas spring 44 may have a much higher rate of 250 lbs. per inch. With these values, the ratios of axial movement of the two springs is 31.25 to 1. Accordingly, for each 0.025 inches of axial movement of actuator 25, valve member 15 moves 0.0008 inches.

To be noted at this point is the fact that the high rate spring 44 underlies the enlargement 42 of the valve member which enlargement has a loose fit within the sidewall of valve chamber 45. Accordingly, spring 44 in cooperation with spring 43 is constantly urging the actuator spindle 25 upwardly with its spherical upper end 35 seated against the conical surface 36 of control knob 31. Accordingly, the combined spring loads are acting on knob 31 to maintain the threads 30 between this knob and bushing 22 in snug-fitting engagement at all times and irrespective of a change in the direction of rotation of the knob thereby eliminating any possibility of lost motion between the mating surfaces of these threads or any other component of the valve assembly.

Referring now to FIG. 2 it is pointed out that the lower end of valve member 15 is there shown as provided with a tapering tip 48 sized to fit against the rim edges of the flow port 14. If valve tip 48 is formed with a conical taper, the flow rate of pressurized liquid flowing through the port will have substantially linear characteristics represented in FIG. 3 throughout an operating range of valve 15 governed by 10 revolutions of knob 31. The uppermost graphical line represents the variation in flow rate when the pressure differential across the valve tip is relatively low, the other graph lines showing the variation in flow rate for correspondingly and progressively higher pressure differentials across the valve port. Typically the graph lines represent the flow characteristics for pressure differentials across the valve of 10, 20, 30, 50 and 80 psi, respectively.

FIG. 4 is a graph similar to FIG. 3 but showing variations of air flow past the same valve as the actuator control knob is varied over a range of 10 revolutions for different pressure differentials across the valve port. The graph line furtherest to the left represents a pressure differential of 1 psi and the others pressure differentials of 5, 10, 25 and 50 psi, respectively.

Different flow characteristics are readily obtained by substituting a valve member 15 having a valve tip 48 of different contour. It will be understood that all parts of the valve are precision made and have low-friction close sliding fit with one another. There is no relative motion between actuator 25 and valve member 15. Actuator 25 is confined to axial movement without lost motion and valve member 15 likewise is restricted to axial movement while suspended between springs 43 and 44 having their remote ends bearing respectively against actuator 25 and the bottom of valve chamber 45. It will be understood that actuator 25 forms an important component of adjusting means for valve member 15 and that the actuator can be axially adjusted either by control knob 31 or directly by a cam or other adjusting means bearing against the outer end of the actuator.

The valve components preferably are made from stainless steel in which event the valve has a pressure range capability from zero to 6000 psig with a pressure differential across the valve port varying between zero and 500 psig.

While the particular high resolution micro-metering valve herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A micro-metering valve comprising: valve body means provided with a fluid flow passage having a flow port opening into a valve chamber, an elongated valve member in said valve chamber movable toward and away from said port to meter flow therepast, valve adjusting means movably mounted on said valve body with the inner end thereof embracing the adjacent end of said valve member and the outer end projecting from said valve body, first and second coil spring, said first spring having a substantially higher spring rate than said second spring, said coil springs being in axial alignment about opposite end portions of said valve member, said valve member being supported between the adjacent ends of said springs, the remote end of said first spring bearing against the interior of said valve body in an area concentric with said flow port and the remote end of said second spring bearing against the inner end of said valve adjusting means, whereby a discreet movement of said valve adjusting means axially of said valve member effects a much smaller micro-movement of said valve member which movement is a function of the differential spring rates of said first and second coil springs.

2. A micro-metering valve as defined in claim 1 characterized in that said valve member includes radially disposed means intermediate the opposite end thereof against which the adjacent ends of said first and second springs rest.

3. A micro-metering valve as defined in claim 2 characterized in that said radially disposed means of said valve member is spaced from the juxtaposed interior surfaces of said valve body and cooperates therewith and with said first and second springs in supporting said valve member for axial movement substantially out of frictional contact with interior surfaces of said valve body while unseated from said flow port.

4. micro-metering valve as defined in claim 1 characterized in that said valve adjusting means is provided with a low pitch threaded connection with said valve body and includes a bore axially thereof having a loose fit with the adjacent end of said valve member to aid in holding said valve member axially aligned with said flow port.

5. A micro-metering valve as defined in claim 1 characterized in that said first spring is relatively long as compared with the length of said second spring.

6. A micro-metering valve as defined in claim 1 characterized in that said second spring is relatively long and has a relatively high spring rate as compared with the spring rate and length of said first spring.

7. A micro-metering valve as defined in claim 6 characterized in that said second spring is located proximate to said flow port and said first spring is more remote from said flow port.

8. A micro-metering valve as defined in claim 1 characterized in that said valve adjusting means includes a rotary operator having a low pitch threaded connection with said valve body, and anti-backlash means interposed between said rotary operator and the remainder of said valve adjusting means and effective in cooperation with said first and second springs to eliminate all lost motion upon reverse rotation of said rotary operator in either direction.

9. A micro-metering valve as defined in claim 1 characterized in that said valve adjusting means includes spindle means reciprocably supported in packing gland means of said valve body and restrained against rotation by frictional contact with the packing, a rotary control member embracing the outer end of said spindle having a low pitch threaded connection with said valve body, and means interconnecting said rotary control member and said spindle means constructed to shift said spindle means in either axial direction free of backlash and lost motion irrespective of a change in the direction of rotation of said control member.

10. A micro-metering valve as defined in claim 1 characterized in that said valve member ha a rigid end seatable against a flow port of rigid material.

11. A micro-metering valve as defined in claim 10 characterized in that said rigid end of said valve member is generally of frusto-conical shape with the smaller end thereof sized to enter said flow port and the larger end thereof larger than said flow port.

12. A micro-metering valve as defined in claim 1 characterized in that said valve member is reciprocably and non-rotatably supported in said valve body means and embraced by fluid-tight packing means mounted in said valve body means.

* * * * *